United States Patent [19]

Enoksson

[11] 3,807,698
[45] Apr. 30, 1974

[54] ELECTRIFIED FENCE
[75] Inventor: Bertil Enoksson, Gyttorp, Sweden
[73] Assignee: Nitro Nobel Akiebolag, Gyttorp, Sweden
[22] Filed: Aug. 14, 1972
[21] Appl. No.: 280,110

[52] U.S. Cl. .............................................. 256/10
[51] Int. Cl. ............................................. A01k 3/00
[58] Field of Search .......... 256/10, 1; 307/132, 106, 307/107, 108; 317/262

[56] References Cited
UNITED STATES PATENTS

| | | | |
|---|---|---|---|
| R19,922 | 4/1936 | Gengler | 256/10 |
| 2,146,229 | 2/1939 | Riepl | 256/10 |
| 2,191,229 | 2/1940 | Ford | 256/10 UX |
| 2,232,881 | 2/1941 | Larson | 256/10 UX |

FOREIGN PATENTS OR APPLICATIONS

| | | | |
|---|---|---|---|
| 892,090 | 10/1953 | Germany | 256/10 |
| 423,705 | 2/1911 | France | 256/10 |
| 940,435 | 3/1956 | Germany | 256/10 |

*Primary Examiner*—Dennis L. Taylor
*Attorney, Agent, or Firm*—Hane, Baxley & Spiecens

[57] ABSTRACT

There is disclosed an electrified fence consisting of a plurality of posts driven into the ground and conductor wires strung between the posts. One of the fence posts is hollow and includes an electric high voltage power supply which is connected to the wires strung between the other posts.

3 Claims, 2 Drawing Figures

PATENTED APR 30 1974 3,807,698

ELECTRIFIED FENCE

The present invention relates to an electrified fence and particularly to an electrified fence for fencing in animals such as cattle or restraining wild animals.

BACKGROUND

There are known electrified fences of the general kind above referred to which consist of suitably placed posts along which wire conductors are strung. These wires are connected to a source of current so selected that an animal touching the wires experiences a deterrent shock but is not actually hurt. Fences of the kind here involved are generally erected in an environment in which a connection to a power main is not readily available. Accordingly, it is the general practice to provide a special high voltage unit for electrifying the fence wires.

Suitable self-contained high voltage power units are disclosed, for instance, in German Pat. 892,090. The required high voltage is usually obtained from several stacked batteries of the flashlight type. The low voltage of such batteries is then stepped in by a transformer which in turn charges a capacitor. The disadvantage of a power unit of this kind is that being located separate from the fence proper it must be connected to the wires thereof by suitable connectors, which are likely to be damaged, for instance, by animals stepping upon the same.

THE INVENTION

It is the broad object of the invention to provide a novel and improved high voltage power unit which is incorporated directly in one of the fence posts so that the fence wires do not require outside connections that are likely to be damaged by animals to be restrained by the fence.

SUMMARY OF THE INVENTION

The afore pointed out objects, features and advantages of the invention and other objects, features and advantages which will be pointed out hereinafter are obtained by providing as one of the fence posts a hollow fence post in which a high voltage power unit is installed. This power unit is directly connected with the fence wires attached to this post and the other fence posts. The power unit may be grounded by covering the tip of the post with a metal covering or making the tip itself of metal. The upper part of the post may be made of a suitable synthetic plastic or other appropriate material. The wires forming the fence are suitably secured to the post, including the power unit, by means of clamps which also serve as electric connectors. The post may be made of one piece or of several pieces suitably joined together.

BRIEF DESCRIPTION OF THE INVENTION

In the accompanying drawing, a preferred embodiment of the invention is shown by way of illustration and not by way of limitation.

In the drawing:

FIG. 1 shows diagrammatically an electrified fence according to the invention enclosing a selected area, one of the fence posts including a high voltage power unit; and FIG. 2 is a sectional view of the fence post including the high voltage power unit on an enlarged scale.

DETAILED DESCRIPTION OF THE INVENTION

Figure 1:
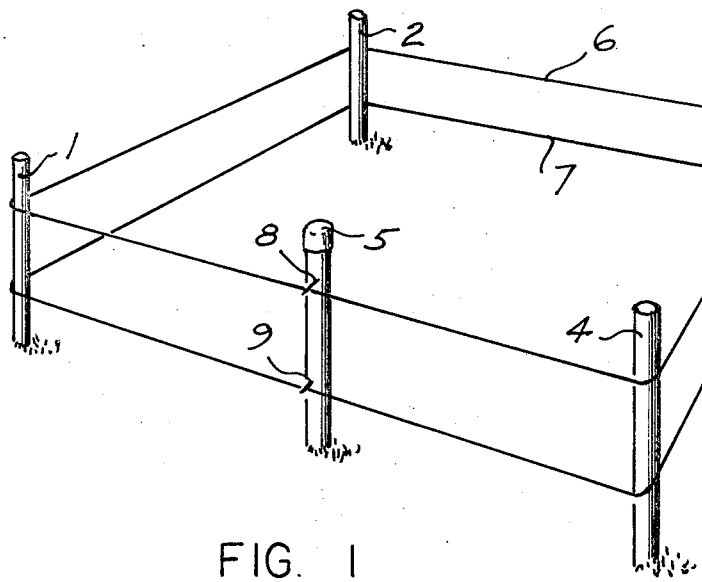
Figure 2:
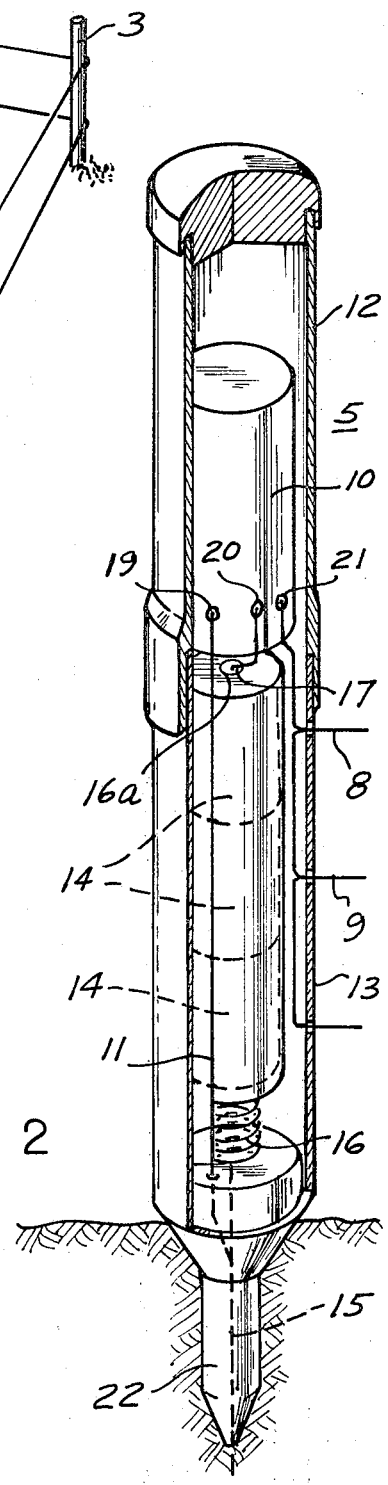

Referring first to FIG. 1 in detail, the exemplified fence comprises five posts 1 to 5 which may be externally alike or of different configurations depending upon the specific requirements of the location. Wires 6 and 7 are strung to the post suitably attached thereto; in actual practice, more than two wires are generally used. The wires are mechanically secured to posts 1,2,3 and 4 but electrically insulated therefrom. Post 5 is the post containing the afore referred to high voltage equipment. The wires 6 and 7 are secured to this post by suitable electric connector means diagrammatically indicated at 8 and 9; additional connector means may of course be provided, one such addditional fastening means may be indicated. The connector means 8 and 9 are electrically connected to a conventional high voltage unit 10 such as a transformer-capacitor network as is shown in FIG. 2. One terminal 21 of the high voltage unit is connected to wire 6 and 7 and a second terminal 19 is grounded by means of wires 11 and 15.

High voltage unit 10 is located in the upper part 12 of the hollow post. This upper part may be secured to the lower part 13 of the post by suitable fastening means such as a bayonnet lock. Lower post part 13 accommodates a source of power 14, such as several stacked batteries of the flashlight type, three stacked batteries being indicated by way of example. The bottom end of post part 13 terminates in a pointed tip 22, preferably made of a metal or sheathed with metal to facilitate driving of the post. Tip 22 is connected to terminal 16 of the power unit 14 by wire 15, the other terminal 16a of this unit is connected by a wire 17 to terminal 20 of the high voltage unit 10.

As previously mentioned, post 5 containing the high voltage equipment may be made of any suitable material, such as, for instance, synthetic plastic. In the event the post is made of metal, it must, of course, be coated with a layer of a suitable electrically insulation material where needed.

When a fence according to the invention is to be erected any number of posts may be used, one of which must be of the kind shown in FIG. 2. The posts are set up one at a time. After completion of the driving of the posts, the electric wires 6 and 7 are mounted on the post, the ends of the wires being connected to post 5 including the high voltage equipment.

It is much more convenient to use, in accordance with the invention, posts, one of which includes the high voltage source than it is first to drive all the fence posts and then to connect the wires thereon to a separately located high voltage unit. One tool can be used for driving all the posts into the ground. Moreover, the posts which do not include a high voltage source can be all alike, that is, the erection of the fence can be standardized and the construction of this special pole, that is, the one which contains the high voltage unit, can also be standardized.

Finally, it should be noted that the electrified fence according to the invention may be used not only to fence in a selected area but also as a barrier for preventing the intrusion of wild animals.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An electrified fence comprising:

a plurality of fence posts all substantially externally alike, one of said posts being a post including a self-contained power supply; and at least two sets of electric conductor wires interconnecting said posts in spaced apart relationship, said wires being secured to said posts and electrically insulated therefrom;

said power supply post being a hollow post having a tip end for ramming the post into ground;

a voltage step-up circuit unit disposed in one part of the supply post and having two terminals, one of said terminals being connected to the fence wires and the other terminal being extended to said tip for grounding the terminal when the post is rammed into ground;

a power supply battery disposed in another part of the post and having two terminals, one of the battery terminals being extended to said tip for grounding said terminal and the other terminal being connected to a third terminal of the step-up circuit unit.

2. The electrified fence according to claim 1 wherein said power supply post is composed of an upper part and a lower part detachably secured to each other, said voltage step-up circuit unit being disposed at the upper part of the post and said supply battery being disposed in the lower part of the post.

3. The electrified fence according to claim 2 wherein said tip of the supply post is metal covered, and extended terminals of the step-up circuit unit and of the supply battery being electrically connected to said metal covering.

* * * * *